Aug. 18, 1925.  
W. F. WITT  
1,550,408  
POWER DEVELOPING APPARATUS OR MECHANISM FOR UTILIZING THE WEIGHT OF WATER  
Filed Nov. 28, 1924     4 Sheets-Sheet 1
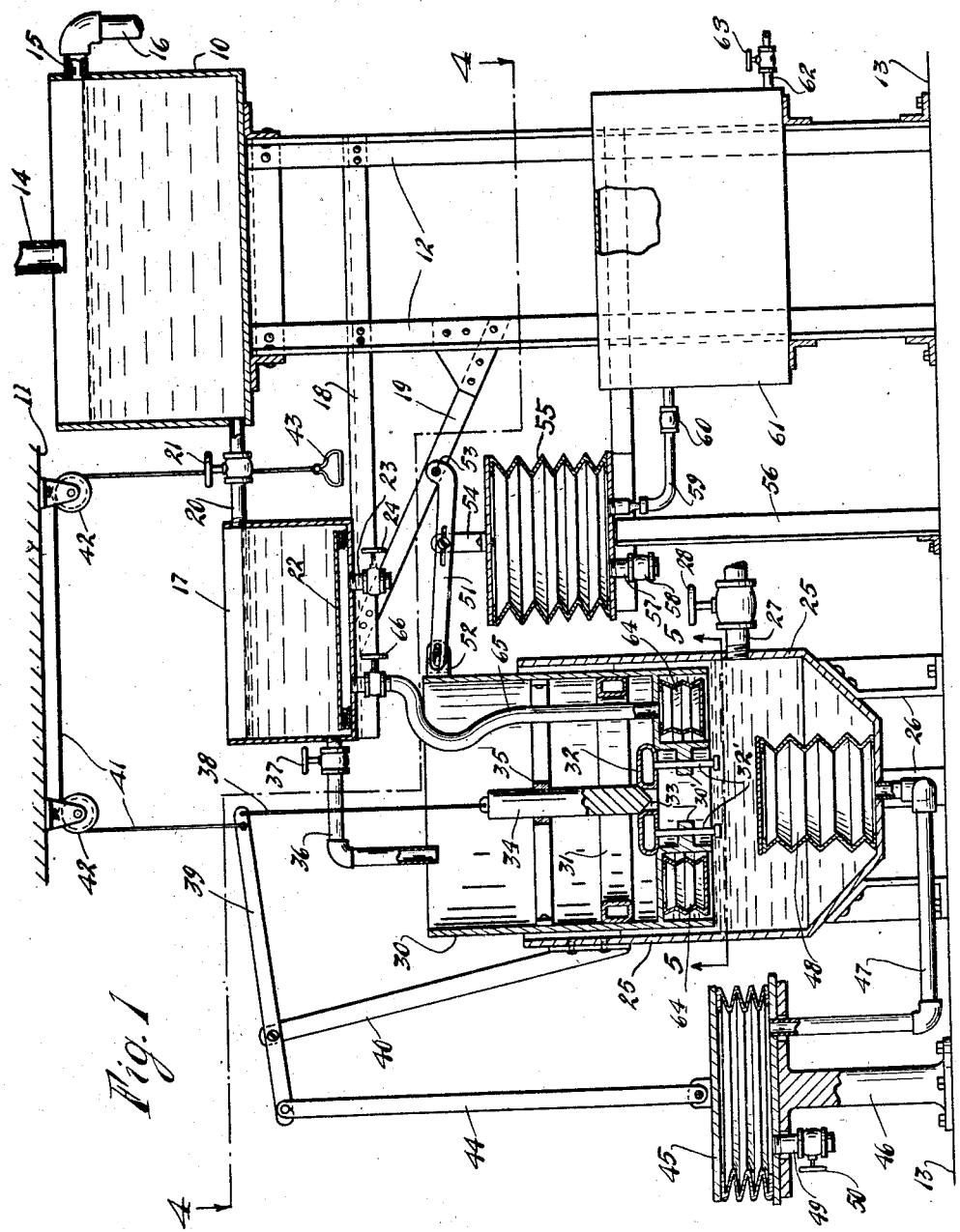
Witnesses:
Inventor:  
William F. Witt  
By Joshua R. H. Potts  
His Attorney.

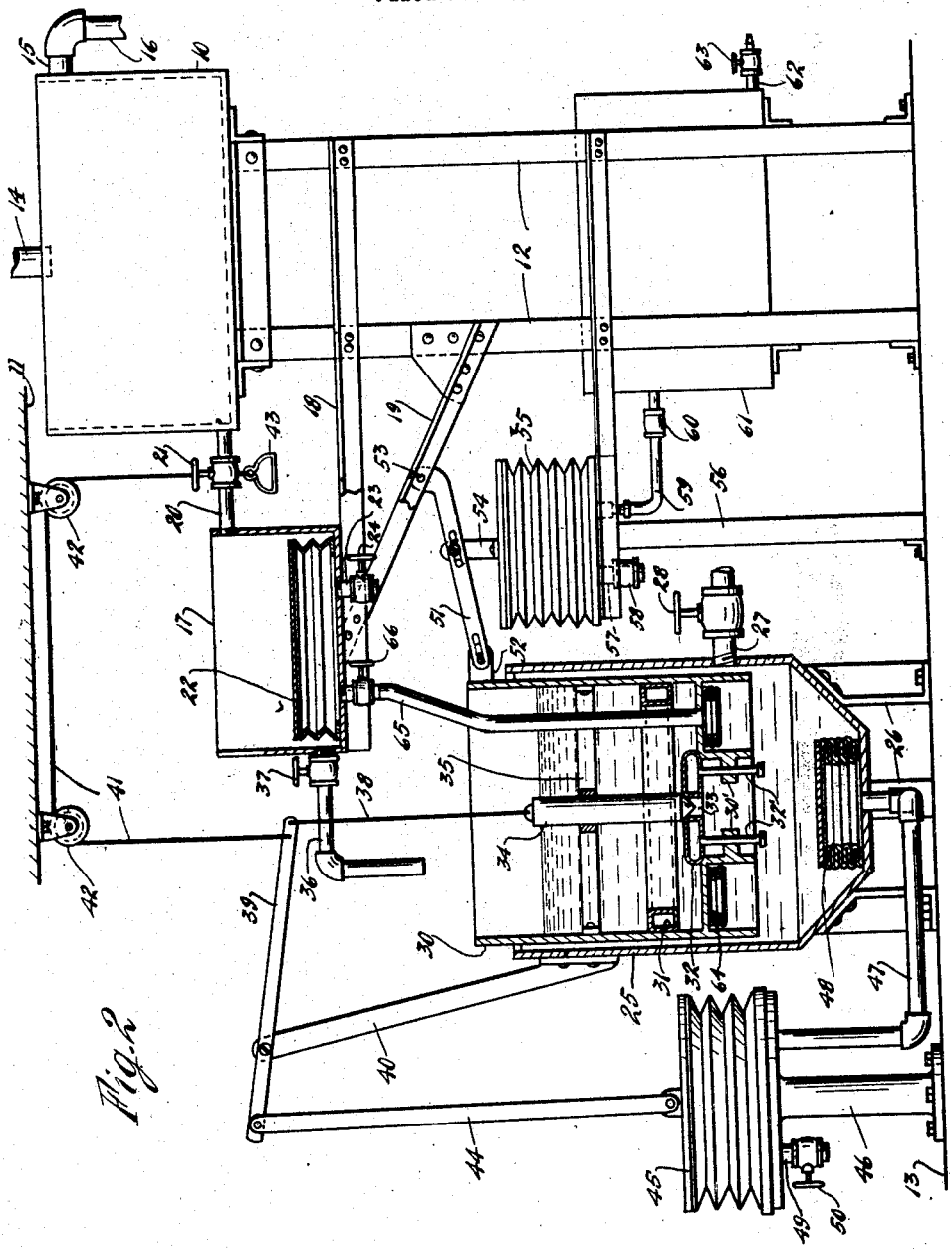

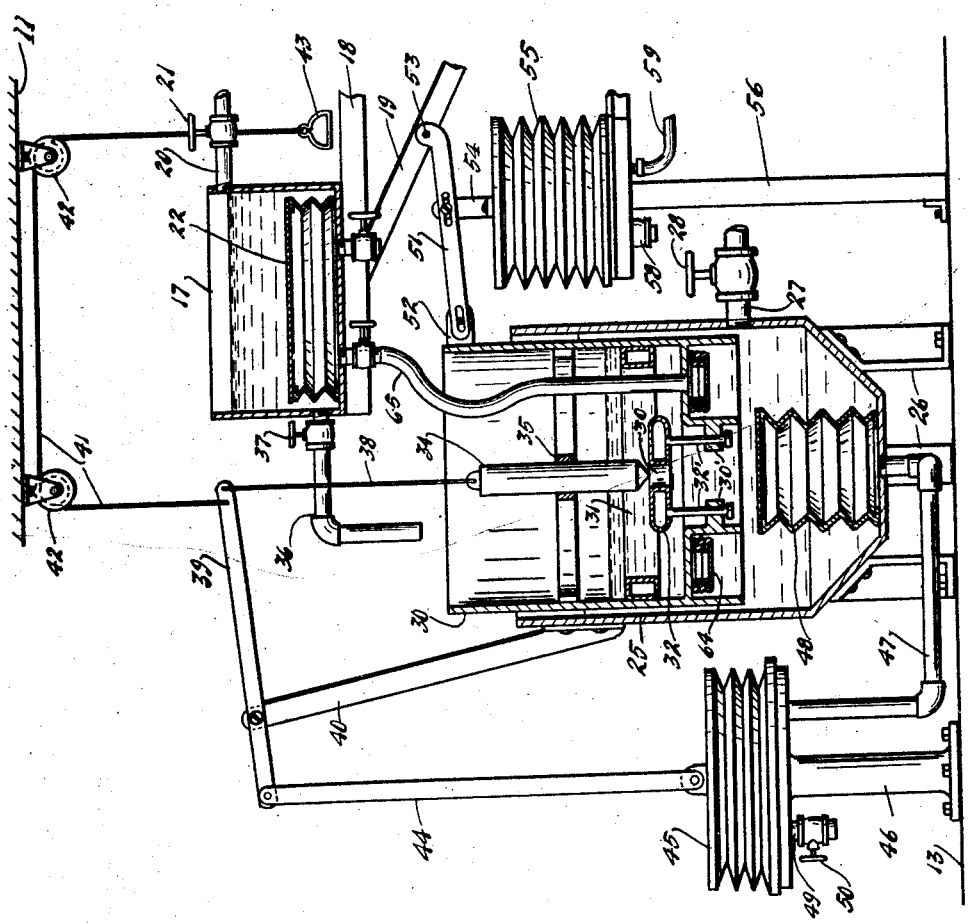

Aug. 18, 1925. 1,550,408
W. F. WITT
POWER DEVELOPING APPARATUS OR MECHANISM FOR UTILIZING THE WEIGHT OF WATER
Filed Nov. 28, 1924 4 Sheets-Sheet 4
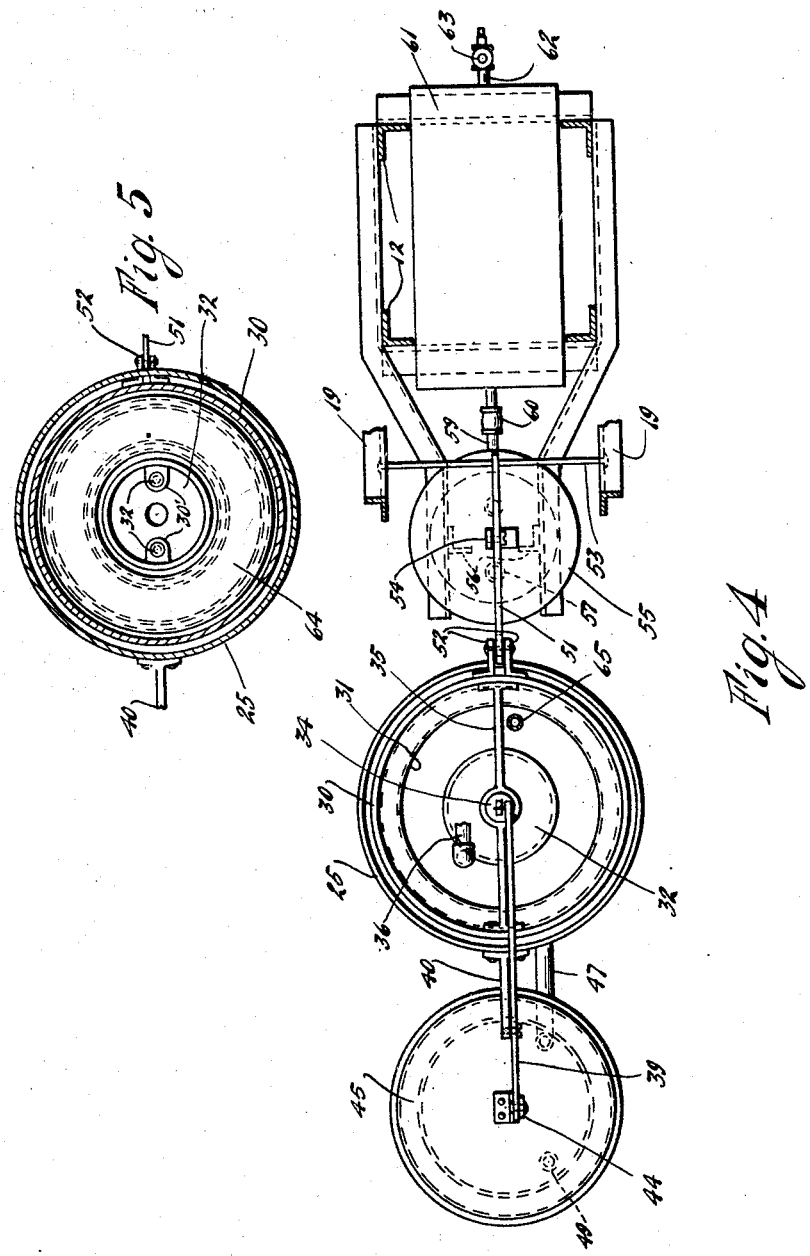
Witnesses:
Inventor:
William F. Witt.
By Joshua H. Poss
his Attorney.

Patented Aug. 18, 1925.

1,550,408

UNITED STATES PATENT OFFICE.

WILLIAM F. WITT, OF CHICAGO, ILLINOIS.

POWER-DEVELOPING APPARATUS OR MECHANISM FOR UTILIZING THE WEIGHT OF WATER.

Application filed November 28, 1924. Serial No. 752,549.

*To all whom it may concern:*

Be it known that I, WILLIAM F. WITT, a citizen of the United States, and a resident of the city of Chicago, county of Cook and State of Illinois, have invented certain new and useful Power-Developing Apparatus or Mechanism for Utilizing the Weight of Water, of which the following is a specification.

My invention relates to a novel power developing apparatus or mechanism for utilizing the weight of water, (especially water which is normally permitted to flow away and the pressure of which is no longer utilized), for developing power and particularly for compressing air with which to do work.

The particular type of my invention illustrated is well adapted to use the spent or waste waters from large buildings, as from the drinking fountains, wash basins or the like, which water will be conducted from one or more of the usual outlet pipes to the receiving reservoir of my apparatus which is preferably stationed in a lower part of such building; but this apparatus may equally as well be operated with water from a flowing stream, or the like, situated at a higher level than my receiving reservoir. It is my object to provide a mechanism for utilizing the weight of such water to do work therewith or for compressing air with which to do work.

Other objects will appear hereinafter.

The invention consists in the combination and arrangements of parts hereinafter described and claimed.

The invention will be best understood by reference to the accompanying drawings forming a part of this specification, and in which—

Fig. 1 is a vertical sectional view of my apparatus, showing the members in position at an early stage of the cycle of operation;

Fig. 2 is a similar view showing the members at a succeeding stage;

Fig. 3 shows the main operating members at nearly the final stage of operation;

Fig. 4 is a plan view taken on line 4—4 of Fig. 1; and

Fig. 5 is an inverted plan view taken on line 5—5 of Fig. 1.

In the drawings I have shown the preferred form of construction embodying my invention, which comprises a reservoir 10 of suitable size and material which may be open or closed, and which is preferably placed in a lower part of a building, as in the basement, being mounted near the upper part or ceiling 11 of such basement by the use of supporting standards 12 fastened to the basement floor 13. A conduit 14 leads into said reservoir and is connected with a source of water supply as for instance the discharge conduits leading from the various drinking fountains, wash basins, etcetera in said building, or is connected with any other suitable water supply. An outlet port 15 and a conduit 16 are provided near the top of said reservoir to prevent overflowing thereof and to lead away any surplus water.

A feed tank 17 is mounted near reservoir 10, and lower than the same, as by means of cross bars 18 and diagonal braces 19 fastened to standards 12, while a pipe 20 with a control valve 21 conducts water from the bottom of reservoir 10 into tank 17. A collapsible air container or case 22 is mounted on the bottom of tank 17 and is provided with an air inlet pipe 23 having a control valve 24 for admitting air to said case whenever required.

A discharge tank 25 is mounted with supports 26 on the floor 13, and is provided with a discharge conduit 27 having a control valve 28 for discharging the used water from the apparatus at the necessary intervals during the cycle of operation. And a floating tank 30 is mounted within tank 25 to move freely up and down therein with the water in said tanks, and buoyant members 31 and 32, like hollow annular rings or members of floatable material, are provided in tank 30 to make it float normally on the water in tank 25. The annular member 32 is provided with pins 32' mounted in lugs 30' to slide upwardly therein and raise said member from the bottom of the tank (see Fig. 3), said member being also arranged to form a valve opening 33 providing communication between the interiors of tanks 25 and 30, said valves being closed by a weighted stem or plunger 34 slidably mounted in a bracket 35 in tank 30; and a pipe 36 with a control valve 37 conducts the water when required from feed tank 17 into floating tank 30.

The means for operating or lifting the weighted valve stem or plunger 34 includes a cable 38 attached thereto and to a bar 39 pivoted on a bracket arm 40, said bar being actuated by a cable 41 attached to it and extending from said bar over pulleys 42 on the ceiling 11, and having a handle or grip 43 at its end. Said bar 39 is connected by a link 44 with a collapsible air container or case 45 mounted on a support 46 on floor 13, and connected by a pipe 47 with a collapsible air container or case 48 mounted in the lower part of tank 25, and an inlet pipe 49 with a control valve 50 are provided for admitting air into said cases 45 and 48. The alternate expanding and collapsing of container 48, due respectively to the alternate decreasing and increasing weight of water in tanks 25 and 30, and the consequent alternate collapsing and expanding of container 45, is also mainly instrumental in raising and lowering respectively the plunger 34 from valve seat 32 at the proper stages of operation.

The means for transferring and utilizing the power developed through the waste water by the movement of tank 30 includes a lever or power transferring member 51 pivoted with one end to an ear 52 on said tank, and fulcrumed with its other end to a rod 53 mounted in diagonal braces 19, said lever being pivoted with its intermediate portion to an arm 54 on an air compressor 55 mounted on a support 56. An inlet pipe 57 with a one-way valve 58 is provided on said compressor, and said compressor is preferably also connected by a pipe 59 with a one-way valve 60 to a storage tank or air reservoir 61 which is provided with a discharge pipe 62 and control valve 63 for using the compressed air whenever desired.

Further means is provided for utilizing the weight of said water in tank 30, for additionally operating said air compressor 55 therewith. This means includes a collapsible air container 64 mounted under the bottom of tank 30, and preferably in a groove or niche therein, said air container being connected by means of a pliable hose 65 and interposed control valve 66 to the air container 22 in tank 17.

In operation the reservoir 10 is substantially filled through the constant addition of water through pipe 14, and any surplus water is run off through the discharge pipe 16 to the sewer or any convenient place. The feed tank 17 is filled from the reservoir by opening valve 21, and when said tank is filled the valve is closed, and the apparatus is substantially in the condition shown in Fig. 1 of the drawings. The weight of the water in tank 17 compresses the air in container 22 which air passes through the open valve 66 and through hose 65 down into the annular container 64 located at the bottom of floating tank 30, thereby expanding said container. The valve 66 is then closed and valve 37 on feed pipe 36 is opened to transfer the water from feed tank 17 into floating tank 30, said floating tank swimming or floating theretofor upon the water normally retained in the lower part of discharge tank 25, as shown in Fig. 1, but with the water transferred from the feed tank to said floating tank, the latter will descend under the weight of said water, and during this descent of the floating tank it carries with it lever 51 and operates the compressor 55 forcing air through the one-way valve 60 into the air container or reservoir 61. Valve 66 is then opened to permit the air from annular container 64, which is now under pressure by the weight of water in tank 30, to travel upward into air container 22 and expand the same in the empty feed tank 17, the apparatus being then substantially in the position shown in Fig. 2. This discharge of air from the container 64 and the consequent collapsing thereof enables the floating tank 30 to descend an additional amount and further actuate lever 51 and compressor 55, thus doing an additional amount of work in forcing an additional amount of compressed air into reservoir 61. Due to the weight of all this water in tank 30 the air container 48 has been collapsed and its communicating container 45 is expanded thus moving upwards the bar 44 and lowering the plunger 34 with the valve seat or member 32. The discharge valve 28 is then opened to permit water to be discharged from tank 25, and about this time the grip or handle member 43 is given a slight downward pull to lift plunger 34 from valve seat or member 32 thus permitting the water to be discharged from tank 30 through opening 33 and through discharge valve 28, and by this discharge of water and decrease of pressure upon the collapsible air container 48, this container will automatically expand, while its communicating container gradually collapses, thereby substantially automatically moving downward bar 44 and upward the plunger 34 to retain it raised from its valve seat, and as the water from floating tank 30 is substantially decreased, the floating member or valve seat 32 will move upwardly from the bottom part of tank 30, thus permitting the water to discharge rapidly into the tank 25, the plunger being at this time at its uppermost position, and all the elements being substantially in the position shown in Fig. 3; whereupon discharge valve 28 is closed and valve 21 is opened and water is run into the feed tank 17, filling the same and placing the apparatus in the position shown in said Fig. 3, said valve 21 being then again closed. Thereafter valve 66 is opened and the water in tank 17 is permitted to collapse the air container 22 in said tank and force said air into the annular container 64 at the bottom of floating tank 30, whereupon the valve 66 is closed, and the entire apparatus is again substantially in the position shown in Fig. 1 to again pass through its cycle of operation.

It is thus seen that the weight of water is used in floating tank 30 to operate directly on the air compressor 55, and furthermore that the compressibility of air is furthermore utilized by the use of the collapsible communicating air containers 64 and 22 which are actuated alternately by the weight of water in tanks 30 and 17 to do an additional amount of work.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. An apparatus including a discharge tank, a float tank, means for feeding water to the latter, power transferring means connected to said float tank, and collapsible air containing means in said float tank arranged to be collapsed for actuating said power transferring means by means of said float tank.

2. An apparatus including a discharge tank, a float tank, a feed tank to feed water to said float tank, power transferring means connected to said float tank, and communicating air containing means in said feed tank and said float tank operable for actuating said float tank and thereby said power transferring means.

3. An apparatus including a discharge tank with a float tank therein and communicating therewith, a compressible air container in said float tank, a feed tank feeding water to said float tank, a collapsible air container in said feed tank, a power transferring member actuated by the movement of said float tank, and valve-controlled means connecting said air containers to be operated for actuating said float tank and its air container for operating said member.

4. An apparatus including a discharge tank with a float tank therein, a valve and plunger in said float tank to provide communication with said discharge tank, a compressible air container in said float tank, a feed tank for selectively feeding water to said float tank, a collapsible air container in said feed tank, a power transferring member actuated by movement of said float tank, means for releasing said plunger from its valve, and valve controlled means connecting said air containers to be operated for actuating said float tank and its air container for operating said member.

5. An apparatus including a discharge tank with a float tank therein, a feed tank for feeding water to said float tank, communicating collapsible air containing means in said feed tank and said float tank, a collapsible air container in said discharge tank, a collapsible air container adjacent said discharge tank and connected with the air container in said tank, valve means providing communication between said float tank and said discharge tank, operative connections between said valve means and the air container adjacent said discharge tank, valve means for discharging water from said discharge tank, a control valve for controlling the exchange of air between the collapsible air containers within the feed tank and the floating tank, and power transferring means connected to said float tank and actuated by the weight of water upon the manipulation of the valves.

6. In combination with a building having waste water conveying means, an apparatus mounted in said building and including a reservoir for receiving waste water from said conveying means, a discharge tank with a float tank therein, a feed tank connected to said reservoir for feeding water therefrom to said float tank, valve controlled connections between said tanks and reservoir, and power transferring means operated by the movement of said float tank.

7. An apparatus including an upper water tank and a lower discharge tank, a floating tank in the latter, valve controlled means for conveying water from the upper tank to the floating tank, a collapsible air container in each of said tanks, a conduit with a control valve connecting said air containers, and power transferring means connected to and operated by said floating tank by collapsing of the air container in said floating tank under the water pressure.

8. An apparatus including a discharge tank with a float tank therein, a feed tank with valve controlled means for discharging water therefrom into said float tank, valve means to provide communication between said float tank and discharge tank, a valve in said discharge tank, collapsible air containers in said float tank and said feed tank, a power transferring lever connected to said float tank to be operated thereby, means for opening the valve between said float tank and discharge tank to permit the water from said float tank to pass through said discharge tank when the valve therein is opened in order to actuate said float tank and said lever, and a valve controlled conduit connecting said collapsible air containers for permitting the air to pass from the container in said float tank under the weight of water in said tank to operate the float tank and the lever thereby.

In testimony whereof I have signed my name to this specification.

WILLIAM F. WITT.